June 27, 1950

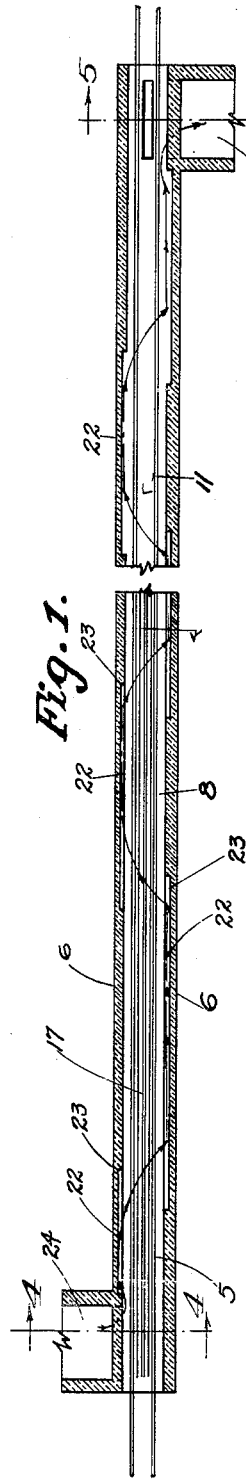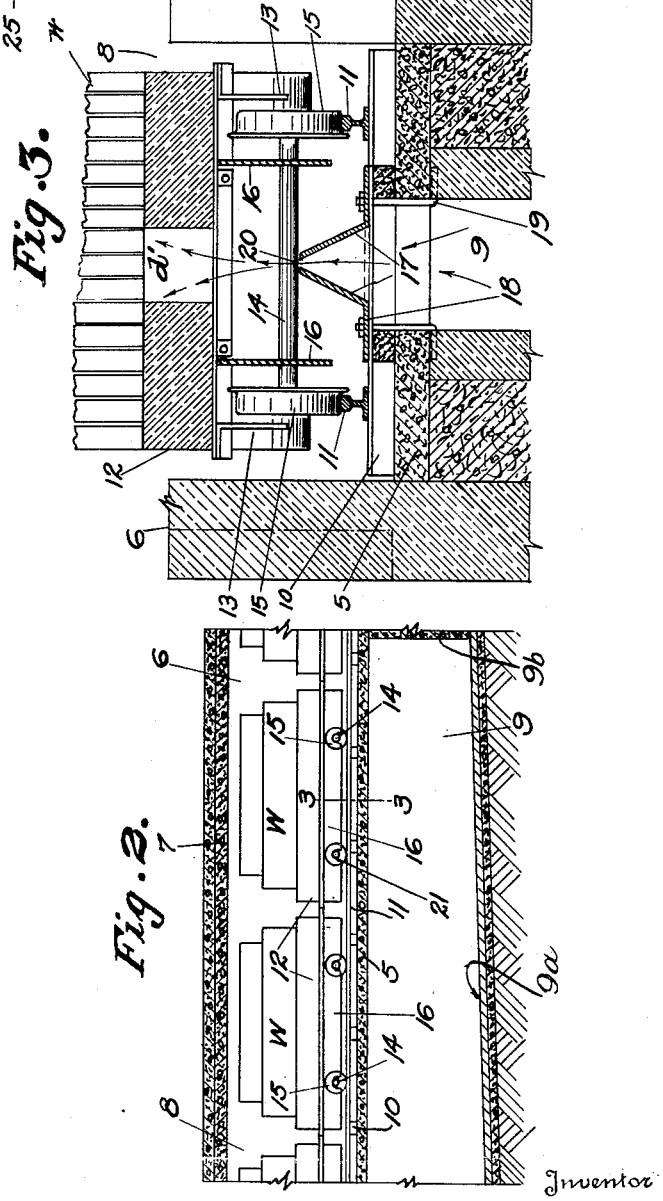

T. W. GARVE 2,513,163

TUNNEL DRIER FOR CERAMIC WARE UTILIZING
UPWARDLY FLOWING HEAT INJECTION

Filed April 11, 1945

Inventor
T. W. Garve
By W. S. McDowell
Attorney

Patented June 27, 1950

2,513,163

UNITED STATES PATENT OFFICE 2,513,163

TUNNEL DRIER FOR CERAMIC WARE UTILIZING UPWARDLY FLOWING HEAT INJECTION

T. Walter Garve, Columbus, Ohio

Application April 11, 1945, Serial No. 587,681

2 Claims. (Cl. 34—226)

This invention relates to drier structures adapted for the heating of moisture-containing ceramic ware to dry the same or reduce the moisture content thereof, having particular reference to driers of the tunnel-type in which the ware is stacked on wheeled cars operating on a trackway and advanced through a confined passage in which heated gases are circulated for contact with the ware.

In the operation of such driers, it is difficult to obtain a flow of the fluid heat carrier so that it contacts evenly with all the ware stacked on the supporting cars in procuring uniformity in the drying of the ware. In this regard, it has been noted particularly that the ware disposed adjacent to the middle region of each stack or grouping thereof on the car decks or platforms is almost invariably under-heated while the ware disposed toward the outer parts may be dried as required. The problem of drying the ware occupying this so-called "wet-spot" region is one of considerable magnitude in the art. If the temperature of the heating gases is increased, the green ware is apt to be overheated, or the drying rate so increased as to injure the ware occupying zones of higher temperature. Also, in such driers, the heated air is apt to be passed too freely along the sides of the tunnel and over the top thereof. Whatever the reasons, it is known in the operation of tunnel driers that the middle region of the ware stacked on the car decks has the slowest drying rate, that is, in this area the ware lags behind or dries last, thus determining the drying time or efficiency of the drier.

Therefore, it is an object of the invention to so construct a tunnel-type drier so that during operation thereof, the ware will be more uniformly heated and the presence of the so-called "wet-spots" in the ware discharged from the drier eliminated or largely avoided.

It is another object of the invention to provide a tunnel-type drier for green ceramic ware, wherein means are provided for so directing the flow and introduction of the moving drying gases into and through the drier that the same will be first brought into contact with the middle and under parts of the car decks before the gases pass into other regions of the tunnel, thus assuring the application of sufficient heat to obtain proper and efficient drying of the middle regions of the ware stacked on the cars.

It is another object of the invention to provide a drier of this character wherein the floor or bottom of the tunnel is formed centrally with a longitudinally extending pit through which the heated gases travel prior to their introduction into the tunnel proper, the top of the pit being closed by upwardly and inwardly directed injector plates, the latter having their upper edges terminated to form a restricted outlet slot disposed in a plane immediately below that occupied by the wheel axles of the ware-supporting cars, whereby the heated gases issuing from the outlet slot of said injector plates will be directed in concentrated flow on the under central regions of the car decks or platforms, assuring proper heating of the ware overlying the same.

A further object is to provide a tunnel drier in which the heated gases are admitted in the manner indicated, and wherein the associated car decks, within the confines of the track-engaging wheels thereof are provided with fixed vertically depending baffle plates or aprons which are coextensive with the length of each car and are arranged on opposite sides of the stationary floor-mounted injector plates, whereby to confine partially the gases issuing from the outlet slot of the injector plates beneath the car decks so that the same may be directed upwardly through the spaced deck members of the car and thereby brought into intimate contact with the middle regions of the ware to effect proper drying thereof.

Still, a further object is to provide a tunnel drier wherein the inner side walls thereof are recessed in a staggered manner to counteract the tendency of the heated air to flow along the tunnel sides in an unchecked manner and thereby escape too quickly. The alternating recesses provide air pockets along the tunnel sides arranged in overlapping relationship and which function to cause the air currents to pass through the ware settings on the associated cars as the gases are caused to flow from one side of the tunnel to the other.

For a further understanding of the invention, and additional objects and advantages thereof, reference is to be had to the following description and the accompanying drawing, wherein:

Fig. 1 is a horizontal sectional view of one complete section of a tunnel drier constructed in accordance with the present invention;

Fig. 2 is a vertical longitudinal sectional view thereof;

Fig. 3 is a vertical transverse sectional view on the plane indicated by the line 3—3 of Fig. 2;

Figure 4:
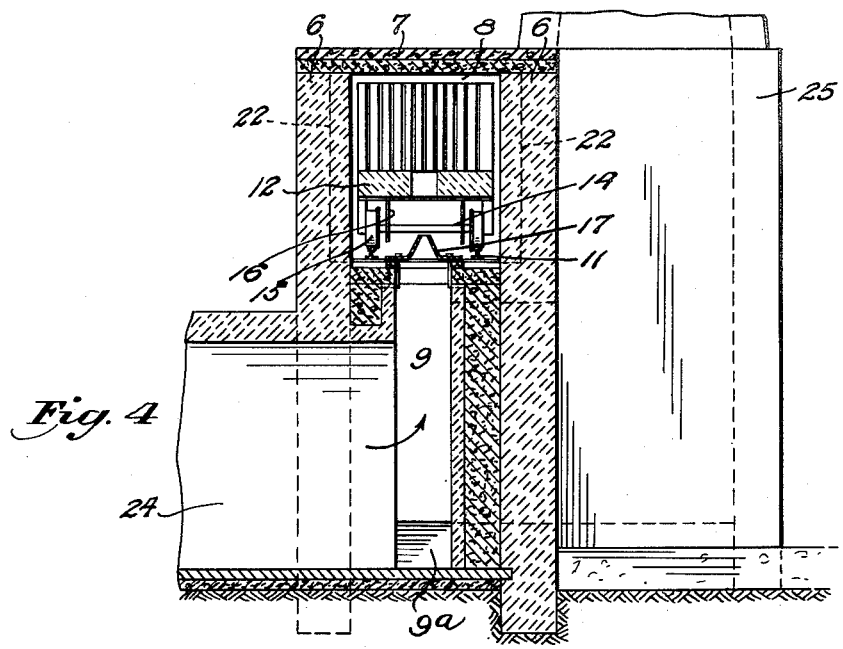
Fig. 4 is a vertical transverse sectional view taken through the inlet end of the drier on the plane indicated by the line 4—4 of Fig. 1.
Figure 5:
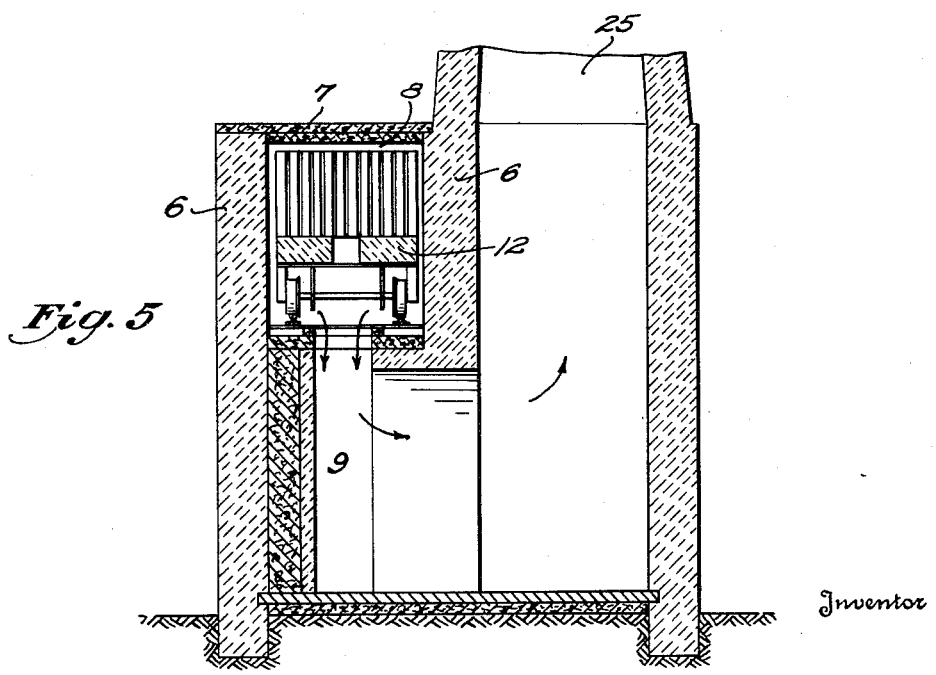
Fig. 5 is a similar view taken through the outlet end of the drier on the plane disclosed by the line 5—5 of Fig. 1.

Referring to the drawings, my improved tunnel drier comprises a masonry structure composed of brick, concrete or other conventional building materials now employed in such constructions, and formed or arranged to provide a base 5, vertical and parallel longitudinally extending side walls 6 and a roof or crown 7, the same forming an elongated passageway or tunnel 6. While but one of such tunnels has been shown in the drawings, it will be understood that any desired number thereof, arranged in parallel relation, may be provided. Within the tunnel, the base or foundation 5 is formed to provide a longitudinally extending pit 9. Air or other gases, heated to required temperatures is introduced into this pit and thereafter, directed into the tunnel. The bottom of the pit 9a is inclined with respect to the horizontal, so that the end of the tunnel into which heated gases are introduced is of greater cross-sectional area than the opposite or closed end thereof. The interior end wall of pit 9 is designated 9b.

The upper surface of the base or foundation 5 is provided with cross ties 10 on which are positioned and secured spaced rails of a trackway 11 and operable over this trackway are the usual drier cars on which the ceramic ware W to be dried is placed in the form of stacks or settings. The cars are formed with the usual decks or platforms 12, carrying depending journals 13 for the rotatable reception of the ends of axles 14, the latter carrying track-engaging wheels 15. In the present invention, each of the cars is provided below its deck and between the wheels 15 thereof with a pair of spaced baffle plates or aprons 16, the latter being coextensive with the length of each car.

Positioned on the top of the pit 9 is a hot air injector comprising a pair of upwardly and inwardly converging plates 17, the lower ends of the latter being outwardly flanged as at 18 for connection with the base 5, as by use of the anchor bolts 19. The upper edges of the plates 17 terminate in spaced relation from each other to form a restricted longitudinally extending air outlet slot 20, which is coextensive with the length of the pit 9.

Consideration will disclose that the heated air, or other gaseous heat carrier, introduced into the pit 9, passes upwardly and issues through the slot 20 into the tunnel region underlying the middle of the car decks. The heated gases are confined in this region by the vertical car-carried baffle plates 16, the latter being provided with openings or slots 21 for the reception of the axles 14. Also, said plates at their lower edges are terminated above the ties 10 for proper clearance therewith, so that heated air is caused to sweep over the middle under surfaces of the car decks and thence upwardly through slots or spaces d' provided in the car decks and spreading into intimate contact with the ware. By this arrangement by directing the flow of heated air, the ware deposited immediately over the middle of the car decks, or in the middle of each stack or setting thereof, is heated to a proper drying temperature during each passage of the ware through the drier. The sloping bottom of the pit is disclosed by the reference character 9a in the drawings.

Another structural feature contributing to the proper and uniform heating and drying of the ware resides in providing the opposite side walls of the tunnel with inwardly extending, relatively overlapping recesses 22, the latter forming at spaced intervals vertical and laterally disposed shoulders 23. Thus as the heated air travels through the tunnel from the inlet end 24 thereof to the chimney 25, the air entering the recesses 22 and moving longitudinally of the tunnel, is deflected by the shoulders 23, as indicated in Fig. 1, and caused to pass through the ware settings on the track mounted cars. When the inner surfaces of the side walls 6 are smooth and uninterrupted, there is a tendency for the moving body of heating air to channel or pass too swiftly through the tunnel. It is my purpose to break up this flow of air by causing it to move laterally across the tunnel as well as longitudinally thereof, so that the cross-flowing air permeates the ware settings more effectively and generally increasing the efficiency of the drier.

I claim:

1. A drier for ceramic ware comprising a heat-confining structure embodying substantially coextensive bottom, top and side walls forming an open-ended tunnel, a trackway on the bottom of said tunnel for the longitudinal advancement of wheeled ware-holding cars through the tunnel, a pit formed longitudinally in the bottom of said tunnel between the tracks of said trackway for the reception of heated gases, injector-forming plates covering the top of said pit and providing a restricted outlet by which the heated gases contained in the pit are directed upwardly toward the middle lower regions of the ware-holding cars, the side walls of said tunnel being formed with longitudinally extending relatively offset recesses.

2. A drier for ceramic ware comprising a heat-confining structure embodying substantially coextensive bottom, top and side walls forming an open-ended tunnel, a trackway on the bottom of said tunnel for the longitudinal advancement of wheeled ware-holding cars through the tunnel, a pit formed longitudinally in the bottom of said tunnel between the tracks of said trackway for the reception of heated gases, injector-forming plates covering the top of said pit and providing a restricted outlet by which the heated gases contained in the pit are directed upwardly toward the middle lower regions of the ware-holding cars, the side walls of said tunnel being formed with longitudinally extending relatively offset recesses, means for introducing heated gases into one end of said pit for longitudinal travel therethrough, and means for withdrawing said gases following extraction of their heat from an end of said tunnel opposite to that in which said gases are introduced.

T. WALTER GARVE.

REFERENCES CITED

The following references are of record in the file of this patent:

UNITED STATES PATENTS

| Number | Name | Date |
|---|---|---|
| 274,907 | Chambers, Jr. | Apr. 3, 1883 |
| 274,910 | Cockell | Apr. 3, 1883 |
| 301,587 | Green | July 8, 1884 |
| 1,150,540 | Ross | Aug. 17, 1915 |
| 1,287,027 | Janson | Dec. 10, 1918 |
| 1,546,180 | Osborn | July 14, 1925 |
| 1,550,714 | Stacey, Jr. | Aug. 25, 1925 |
| 1,724,325 | Straight | Aug. 13, 1929 |
| 1,754,351 | Cobb | Apr. 15, 1930 |
| 1,777,255 | Creighton | Sept. 30, 1930 |
| 2,157,975 | Wilson | May 9, 1939 |

FOREIGN PATENTS

| Number | Country | Date |
|---|---|---|
| 4,244 | Australia | Oct. 13, 1926 |
| 658,693 | Germany | Apr. 14, 1938 |